(12) United States Patent
Zhang et al.

(10) Patent No.: US 12,393,837 B2
(45) Date of Patent: Aug. 19, 2025

(54) VEHICLE CONTROL METHOD, ELECTRONIC DEVICE AND MEDIUM

(71) Applicant: GUANGZHOU AUTOMOBILE GROUP CO., LTD., Guangzhou (CN)

(72) Inventors: Jiucai Zhang, Sunnyvale, CA (US); Yi Wang, Guangzhou (CN)

(73) Assignee: GUANGZHOU AUTOMOBILE GROUP CO., LTD., Guangdong (CN)

(*) Notice: Subject to any disclaimer, the term of this patent is extended or adjusted under 35 U.S.C. 154(b) by 931 days.

(21) Appl. No.: 17/456,729

(22) Filed: Nov. 29, 2021

(65) Prior Publication Data

US 2023/0169322 A1 Jun. 1, 2023

(51) Int. Cl.
*G06N 3/08* (2023.01)
*B60W 50/00* (2006.01)

(52) U.S. Cl.
CPC ............ *G06N 3/08* (2013.01); *B60W 50/00* (2013.01); *B60W 2050/0083* (2013.01)

(58) Field of Classification Search
CPC ............ G06N 3/08; G06N 3/006; G06N 7/01; G06N 20/00; B60W 50/00; B60W 2050/0083; B60W 2050/0075; B60W 2556/45; B60W 2556/50; B60W 60/0011
See application file for complete search history.

(56) References Cited

U.S. PATENT DOCUMENTS

| 2018/0105185 A1* | 4/2018 | Watanabe | ............. B60W 50/14 |
| 2019/0163182 A1 | 5/2019 | Li et al. | |
| 2020/0074266 A1 | 3/2020 | Peake et al. | |
| 2020/0353943 A1* | 11/2020 | Siddiqui | ................. G06N 3/045 |
| 2023/0041975 A1* | 2/2023 | Caldwell | ........... B60W 60/0027 |

FOREIGN PATENT DOCUMENTS

| CN | 110647839 A | 1/2020 |
| CN | 111339851 A | 6/2020 |
| CN | 112822684 A | 5/2021 |
| CN | 113076897 A | 7/2021 |

OTHER PUBLICATIONS

Office Action mailed to Corresponding Taiwanese Patent Application No. 202210618937 dated Jan. 17, 2025.
Search Report mailed to Corresponding Taiwanese Patent Application No. 202210618937.

* cited by examiner

*Primary Examiner* — Aniss Chad
*Assistant Examiner* — Christine Nguyen Huynh
(74) *Attorney, Agent, or Firm* — Hodgson Russ LLP

(57) ABSTRACT

The vehicle control method includes: acquiring vehicle parameters of a target vehicle and scene parameters of a scene where the target vehicle is located; searching for a target strategy corresponding to the vehicle parameters and the scene parameters in a strategy library, if the vehicle parameters are within a preset vehicle parameter range and the scene parameters are within a preset scene parameter range; inputting the vehicle parameters and the scene parameters into a pre-training model to generate the target strategy, if the vehicle parameters are not within the preset vehicle parameter range or the scene parameters are not within the preset scene parameter range; and controlling the target vehicle based on the target strategy.

14 Claims, 3 Drawing Sheets

VEHICLE CONTROL METHOD, ELECTRONIC DEVICE AND MEDIUM

TECHNICAL FIELD

The present disclosure relates to autonomous vehicles, and more particularly to a vehicle control method, an electronic device and a medium.

BACKGROUND

With the gradual improvement of people's living standards and the increasing number of vehicles, the safety requirements for autonomous driving are getting higher and higher.

Traditionally, it is usually necessary to determine the driving strategy of the vehicle according to the scene where the vehicle is located. Therefore, it is an urgent problem to be solved for accurately determining the driving strategy of the vehicle according to the scene.

SUMMARY

There are provided a vehicle control method, an electronic device and a medium according to embodiments of the present disclosure. The technical solutions are as below:

According to a first aspect of embodiments of the present disclosure, there is provided a vehicle control method, comprising:

acquiring vehicle parameters of a target vehicle and scene parameters of a scene where the target vehicle is located;

searching for a target strategy corresponding to the vehicle parameters and the scene parameters in a strategy library, if the vehicle parameters are within a preset vehicle parameter range and the scene parameters are within a preset scene parameter range;

inputting the vehicle parameters and the scene parameters into a pre-training model to generate the target strategy, if the vehicle parameters are not within the preset vehicle parameter range or the scene parameters are not within the preset scene parameter range; and controlling the target vehicle based on the target strategy.

According to a second aspect of embodiments of the present disclosure, there is an electronic device, comprising:

a memory, for storing computer-readable instructions; and a processor, for reading the computer-readable instructions stored in the memory to execute a vehicle control method, wherein the vehicle control method comprises:

acquiring vehicle parameters of a target vehicle and scene parameters of a scene where the target vehicle is located;

searching for a target strategy corresponding to the vehicle parameters and the scene parameters in a strategy library, if the vehicle parameters are within a preset vehicle parameter range and the scene parameters are within a preset scene parameter range;

inputting the vehicle parameters and the scene parameters into a pre-training model to generate the target strategy, if the vehicle parameters are not within the preset vehicle parameter range or the scene parameters are not within the preset scene parameter range; and controlling the target vehicle based on the target strategy.

According to a third aspect of embodiments of the present disclosure, there is provided a non-transitory computer-readable storage medium, wherein the non-transitory computer-readable storage medium stores computer-readable instructions, and when the computer-readable instructions are executed by a processor of a computer, the computer is caused to execute the method of the first aspect of embodiments of the present disclosure.

BRIEF DESCRIPTION OF THE DRAWINGS

The drawings herein are incorporated into the specification and constitute a part of the specification, show embodiments that conform to the application, and explain the principle of the application together with the specification.

DETAILED DESCRIPTION

Figure 1:
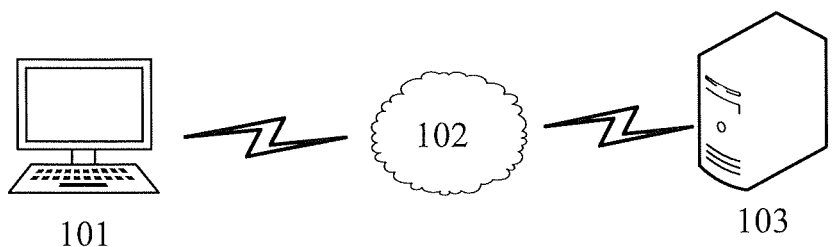
FIG. 1 shows a schematic diagram of an exemplary system architecture to apply the technical solutions according to an exemplary embodiment.

Exemplary embodiments will now be described more fully with reference to the accompanying drawings. However, the exemplary embodiments can be implemented in various forms, and should not be construed as being limited to the examples set forth herein. On the contrary, these embodiments are provided for making this application more comprehensive and complete, and fully conveying the concept of the exemplary embodiments to those skilled in the art.

In addition, the described features, structures, or characteristics can be combined in one or more embodiments in any suitable manner. In the following description, many specific details are provided to give a sufficient understanding of the embodiments of the present disclosure. However, those skilled in the art will realize that the technical solutions of the present disclosure can be practiced without one or more of the specific details, or other methods, components, devices and steps can be used. In other cases, well-known structures, methods, devices, implementations, materials, or operations are not shown or described in detail in order to avoid obscuring aspects of the present disclosure.

The block diagrams shown in the drawings are merely functional entities, and do not necessarily correspond to physically independent entities. That is, these functional entities can be implemented in the form of software, or implemented in one or more hardware modules or integrated circuits, or implemented in different networks and/or processor devices and/or microcontroller devices.

The flowchart shown in the drawings is only an exemplary description, and does not necessarily include all contents and operations/steps, nor does it have to be executed in the described order. For example, some operations/steps can be decomposed, and some operations/steps can be combined or partially combined, so the actual execution order may be changed according to actual conditions.

FIG. 1 shows a diagram of an exemplary system architecture 100 to apply the technical solutions according to an embodiment of the present disclosure.

As shown in FIG. 1, the system architecture 100 may include a client 101, a network 102, and a server 103. The network 102 is a medium used to provide a communication link between the client 101 and the server 103. The network 102 may include various connection types, such as wired communication links and wireless communication links, which are not limited herein in the present disclosure.

It should be understood that the numbers of the client 101, the network 102, and the server 103 in FIG. 1 are merely illustrative. There can be any number of clients 101, networks 102, and servers 103 according to implementation requirements. For example, the server 103 can be an independent physical server, or a server cluster or a distributed system composed of multiple physical servers, or can also be a cloud server that provides basic cloud computing services such as cloud service, cloud database, cloud computing, cloud function, cloud storage, network service, cloud communication, middleware service, domain name service, security service, Content Delivery Network (CDN), big data and artificial intelligence platform. The client 101 may be a smart phone, a tablet computer, a notebook computer, a desktop computer, a smart speaker and a smart watch, which is not limited herein.

In an embodiment of the present disclosure, the server 103 acquires the vehicle parameters of the target vehicle and the scene parameters of the scene where the target vehicle is located. If the vehicle parameters are within a preset vehicle parameter range and the scene parameters are within a preset scene parameter range, the target strategy corresponding to the vehicle parameters and scene parameters are searched in the strategy library. If the vehicle parameters are not within the preset vehicle parameter range or the scene parameters are not within the preset scene parameter range, the vehicle parameters and scene parameters are input into the pre-training model, to generate a target strategy. The target vehicle is controlled based on the target strategy, so that the target strategy of the target vehicle in a variety of scenarios can be found, and the target vehicle can be better controlled, thereby increasing the stability of determining the driving strategy of the vehicle according to the scene.

It should be noted that the vehicle control method provided by the embodiment of the present disclosure is generally executed by the server 103, and correspondingly, the vehicle control device is generally provided in the server 103. However, in other embodiments of the present disclosure, the client 101 and the server 103 may also have similar functions, so as to execute the vehicle control method provided in the embodiments of the present disclosure.

Figure 2:
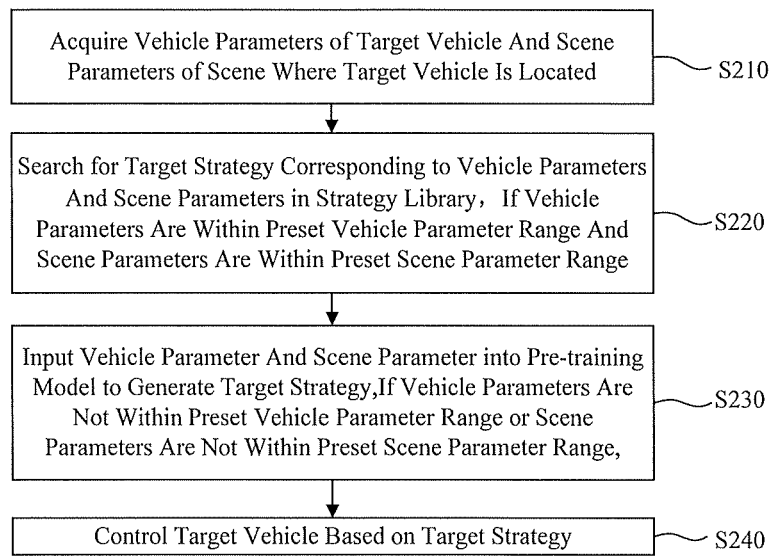
FIG. 2 schematically shows a flowchart of a vehicle control method according to an exemplary embodiment.

The implementation details of the technical solutions of the embodiments of the present disclosure are described in detail as follows:

FIG. 2 schematically shows a flowchart of a vehicle control method according to an embodiment of the present disclosure. The execution subject of the vehicle control method may be a server, for example, the server 103 shown in FIG. 1.

Referring to FIG. 2, the vehicle control method includes at least step S210 to step S240, which are described in detail as follows:

In step S210, the vehicle parameters of the target vehicle and the scene parameters of the scene where the target vehicle is located are acquired.

In an embodiment of the present disclosure, the vehicle parameters may include the position, velocity, size of the target vehicle, whether there is signal control and whether the vehicle is lying sideways. The scene parameters may include surrounding vehicle parameters, road parameters, and surrounding non-motor vehicle parameters. The surrounding vehicle parameters may include vehicle position, velocity, size, signal control and whether the vehicle is lying sideways. The road parameters may include radius of curvature, number of lanes, whether there is signal light and whether the vehicle is lying sideways. The surrounding non-motor vehicle parameters may include non-motor vehicle position, velocity, size and presence or absence of signal control. The non-motor vehicle types may include pedestrians, motorcycles, bicycles and electric vehicles. The scene parameters should be selected according to the scene characteristics, which not only ensure that the scene has a certain degree of independence, but also the coverage of the scene is considered.

In an embodiment of the present disclosure, the scene where the target vehicle is located can be obtained, and the scene is analyzed to obtain the scene parameters of the scene where the target vehicle is located.

In step S220, if the vehicle parameters are within the preset vehicle parameter range and the scene parameters are within the preset scene parameter range, the target strategy corresponding to the vehicle parameters and the scene parameters are searched in the strategy library.

In an embodiment of the present disclosure, the preset vehicle parameter range can be set in advance, and the vehicle parameter range and the scene parameter range can correspond to each other. The specified scene parameters may correspond to the specified vehicle parameter range. When the scene parameters change, the vehicle parameters corresponding to the scene parameter range also change.

In an embodiment of the present disclosure, the specified vehicle parameter range may be determined according to the parameters when the vehicle is in an extreme situation under the specified scene parameters.

In an embodiment of the present disclosure, the scene parameter range can be determined according to the scene parameters in the extreme scene, and the vehicle parameter range can be determined according to the scene parameter range. The extreme scene can be set according to the date, time, location, weather, road condition and terrain.

In an embodiment of the present disclosure, before searching for the target strategy corresponding to the vehicle parameters and the scene parameters in the strategy library, an online model based on optimization can be developed, such as a Partially Observable Markov Decision Process, which can obtain simulation data. The simulation data includes vehicle simulation data and scene simulation data. The simulation data can be inputted into the Partially Observable Markov Decision Process (POMDP), to obtain the prediction strategy corresponding to the simulation data output by the Partially Observable Markov Decision Process. The simulation data and the prediction strategy are stored correspondingly to form a strategy library.

In an embodiment of the present disclosure, the strategy database can be retrieved by a method such as the Structured Query Language (SQL), and the strategy database can be an offline database.

In step S230, if the vehicle parameters are not within the preset vehicle parameter range or the scene parameters are not within the preset scene parameter range, the vehicle parameters and the scene parameters are input into the pre-training model to generate the target strategy.

In an embodiment of the present disclosure, the scene simulation data includes dynamic simulation data and static simulation data. Before inputting the vehicle parameters and scene parameters into the pre-training model, the vehicle simulation data, the dynamic simulation data, and the static simulation data can be clustered separately. The k-Nearest Neighbors (KNN) algorithm can be adopted for clustering, to obtain a vehicle clustering result, a dynamic clustering result and a static clustering result. The training data are generated based on the vehicle clustering result, the dynamic clustering results and the static clustering result, which include vehicle training data, dynamic training data, and static training data. The training data are used to train the neural network model to obtain the pre-trained model.

In an embodiment of the present disclosure, the neural network model may be a Partially Observable Markov model, a classification model such as a Random Forest, or a Deep Learning Model.

In an embodiment of the present disclosure, the corresponding relationship among the vehicle simulation data, the dynamic simulation data, and the static simulation data can be determined according to the scene and the vehicle parameters suitable for the scene, and corresponding vehicle simulation data, dynamic simulation data, and static simulation data are taken mutually as a group of parameters, to cluster the vehicle simulation data, the dynamic simulation data, and the static simulation data simultaneously in groups.

In this embodiment, the vehicle simulation data, the dynamic simulation data, and the static simulation data are distributed independently of each other. For example, they can be differentiated and controlled by the mean and variance of the distribution, and the vehicle simulation data, the dynamic simulation data and the static simulation data can also be generated by simulation.

In an embodiment of the present disclosure, the vehicle training data can be selected from the vehicle cluster of the vehicle clustering results, and the difference degree of the vehicle training data in the same vehicle cluster is greater than the set minimum vehicle difference degree. The dynamic training data are selected from the dynamic cluster of the dynamic clustering results, and the difference degree of the dynamic training data in the same dynamic cluster is greater than the set minimum dynamic difference degree. The static training data is selected from the static cluster of the static clustering results, and the difference degree of static training data in the same static cluster is greater than the set minimum static difference degree, so that the vehicle training data, the dynamic training data and the static training data can cover a variety of situations as comprehensively as possible. At the same time, compared to directly using the vehicle simulation data, the dynamic simulation data and the static simulation data to train the neural network model, training the neural network model by using the vehicle training data, dynamic training data and static training data can save training time.

In an embodiment of the present disclosure, the preset vehicle parameter range and the preset scene parameter range may be determined according to simulation data.

In an embodiment of the present disclosure, the relationship among the vehicle parameters the scene parameters and the target strategy can be constructed through a decision tree, or through a Reinforcement Learning Algorithm (Q-learning) or a Deep Learning Network.

In an embodiment of the present disclosure, if the vehicle parameters are not within the preset vehicle parameter range or the scene parameters are not within the preset scene parameter range, the vehicle parameters, the scene parameters, and the target strategy can be correspondingly stored in the strategy library.

In an embodiment of the present disclosure, the recommended vehicle parameter range of the vehicle can be determined based on the scene parameters. If the recommended vehicle parameter range does not intersect with the target vehicle's capacity vehicle parameter range, it can be determined that the target vehicle is not capable of running in the scene where the target vehicle is located. In operation, the recommended vehicle parameter range is used to indicate that the target vehicle is not damaged when driving in the scene corresponding to the scene parameters. The capacity vehicle parameter range can be obtained according to the driving situation of the target vehicle in the standard scene, and the standard scene is the most suitable scene for the vehicle.

In this embodiment, the limitation of the target vehicle's motion capability is taken into account, so that the target vehicle can be better controlled.

Referring to FIG. 2 again, in step S240, the target vehicle is controlled based on the target strategy.

In the embodiment of FIG. 2, the vehicle parameters of the target vehicle and the scene parameters of the scene where the target vehicle is located are acquired. If the vehicle parameters are within the preset vehicle parameter range and the scene parameters are within the preset scene parameter range, the target strategy corresponding to the vehicle parameters and the scene parameters are searched in the strategy library. If the vehicle parameters are not within the preset vehicle parameter range, or the scene parameters are not within the preset scene parameter range, the vehicle parameters and the scene parameters are input into the pre-training model to generate the target strategy. The target vehicle is controlled based on the target strategy, so that the target vehicle in multiple scenes can be controlled, and the target vehicle can be better controlled, thereby increasing the stability of determining the driving strategy of the vehicle according to the scene.

In an embodiment of the present disclosure, the vehicle control method of the present disclosure is applied by using an offline database strategy and an online model generation strategy. The offline strategy solves problems of the automatic driving strategy under complex working conditions by using traditional data. In the decision-making process, static driving scenes and dynamic traffic participants are taken into account, and the limitations of vehicle motion capabilities are also taken into account. The offline strategy is classified according to the characteristics of static scenes and dynamic traffic participants, and the optimal strategy is calculated using optimization algorithms, and an optimal strategy library is generated by the optimal strategies calculated by the characteristics of different static scenes and dynamic traffic participants. The optimal strategy can be directly queried according to the scene matching. In order to make up for the shortcomings that the offline event strategy customized for specific static scenes and dynamic traffic participant characteristics cannot cover all possible scenes and vehicle configuration pre-calculated strategies, the present disclosure also proposes online strategies, which generate automatic driving strategies based on the uncovered scenes, thereby solving the problem of unknown scene decision-making. Moreover, the calculated optimal strategy is stored in the offline strategy library, thereby improving the ability and coverage of the offline strategy.

Figure 3:
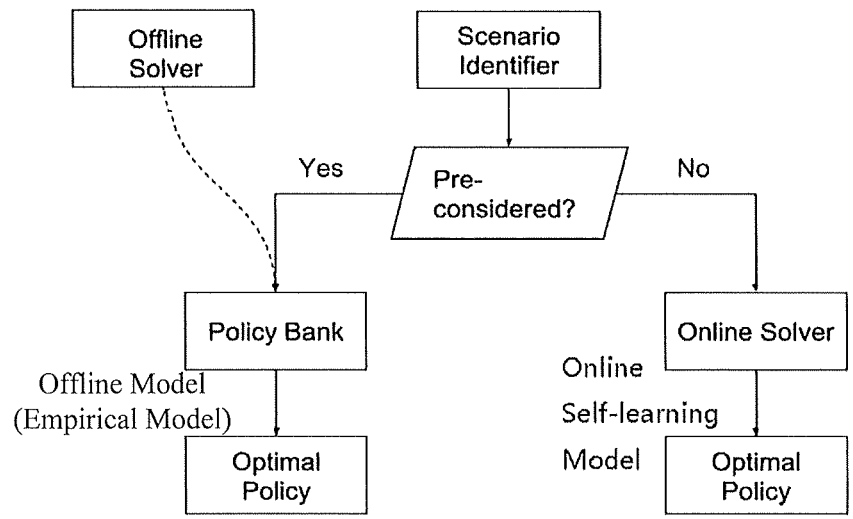
FIG. 3 schematically shows an architecture diagram of the vehicle control method according to an exemplary embodiment.

In an embodiment of the present application, a vehicle control system architecture used to implement the vehicle control method of the present application is shown in FIG. 3, and FIG. 3 schematically shows a architecture diagram of the vehicle control system according to an embodiment of the present application. As shown in FIG. 3, the vehicle control system may include: scenario identifier, pre-considered, policy bank, and online slover. The scenario identifier is configured to obtain the vehicle parameters of the target vehicle and the scene parameters of the scene where the target vehicle is located. The pre-considered is configured to judge whether the vehicle parameters are within the preset vehicle parameter range, and the pre-considered is also configured to judge whether the scene parameters are within the scene parameter range. The policy bank is configured to store the vehicle control strategy where the vehicle parameters are within the preset vehicle parameter range and the scene parameters are within the preset scene parameter range. The strategies stored in the strategy library may come from the offline slover. The optimal policy may be found from the strategy library. The online slover is configured to generate the optimal policy when the vehicle parameters are not within the preset vehicle parameter range or the scene parameters are not within the preset scene parameter range. The vehicle control method of the present disclosure is adopted to make the unmanned vehicle adapt to unknown scenes, and realize the automatic driving strategy by using limited data. The driving strategy continuously improves the performance in the actual scene to have the adaptive ability.

The device in the embodiment of the present disclosure described below may be used to execute the vehicle control method in the foregoing embodiment of the present disclosure. For details that are not disclosed in the device embodiments of the present disclosure, please refer to the above-mentioned vehicle control method in the embodiments of the present disclosure.

Figure 4:
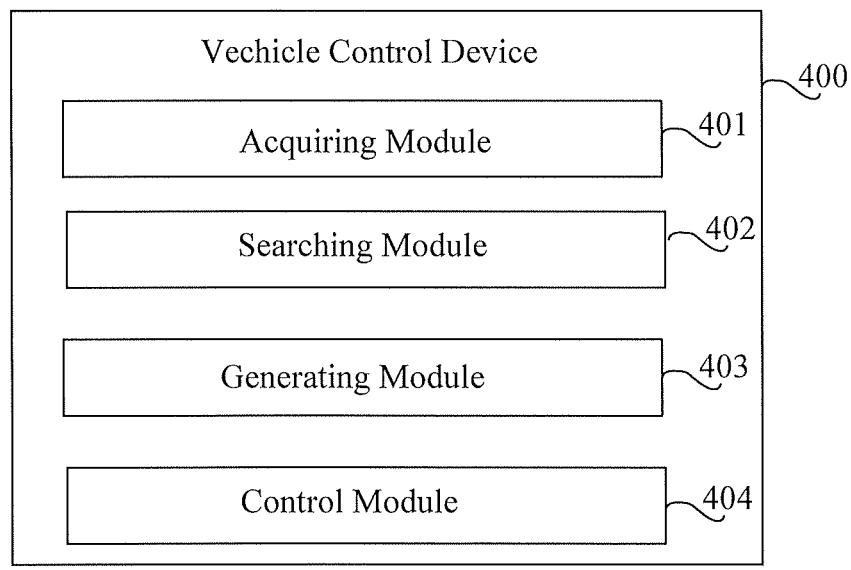
FIG. 4 schematically shows a block diagram of a vehicle control device according to an exemplary embodiment.

FIG. 4 schematically shows a block diagram of a vehicle control device according to an embodiment of the present disclosure.

Referring to FIG. 4, a vehicle control device 400 according to an embodiment of the present disclosure includes an acquiring module 401, a searching module 402, a generating module 403, and a control module 404.

According to an aspect of the embodiments of the present disclosure, based on the foregoing solution, the acquiring module 401 is configured to acquire the vehicle parameters of the target vehicle and the scene parameters of the scene where the target vehicle is located. The searching module 402 is configured to search for a target strategy corresponding to the vehicle parameters and the scene parameters in a strategy library if the vehicle parameters are within a preset vehicle parameter range and the scene parameters are within a preset scene parameter range. The generating module 403 is configured to input the vehicle parameters and the scene parameters into the pre-training model to generate the target strategy if the vehicle parameters are not within the preset vehicle parameter range or the scene parameters are not within the preset scene parameter range. The control module 404 is configured to control the target vehicle based on the target strategy.

In an embodiment of the present disclosure, based on the foregoing solution, before searching for the target strategy corresponding to the vehicle parameters and the scene parameters in the strategy library, the searching module 402 is configured to: acquire simulation data, which includes vehicle simulation data and scene simulation data; input the simulation data into the Partially Observable Markov Decision Process, to obtain the prediction strategy corresponding to the simulation data output by the Partially Observable Markov Decision Process; and correspondingly store the simulation data and the prediction strategy to form a strategy library.

In an embodiment of the present disclosure, based on the foregoing solution, the scene simulation data includes dynamic simulation data and static simulation data. Before inputting the vehicle parameters and scene parameters into the pre-training model, the generating module 403 is further configured to: cluster vehicle simulation data, dynamic simulation data and static simulation data separately to obtain a vehicle clustering result, a dynamic clustering result, and a static clustering result; generate training data, which includes the vehicle training data, the dynamic training data and the static training data, based on the vehicle clustering result, the dynamic clustering result, and the static clustering result; and train the neural network model by using the training data to obtain the pre-training model.

In an embodiment of the present disclosure, based on the foregoing solution, the generating module 403 is configured to: select vehicle training data from the vehicle cluster of the vehicle clustering results, and the difference degree of the vehicle training data in the same vehicle cluster is greater than the set minimum vehicle difference degree; select the dynamic training data from the dynamic cluster of the dynamic clustering results, and the difference degree of the dynamic training data in the same dynamic cluster is greater than the set minimum dynamic difference degree; and select the static training data from the static cluster of the static clustering results, and the difference degree of the static training data in the same static cluster is greater than the set minimum static difference degree. The degree of difference refers to the distance between cluster data in a cluster.

In an embodiment of the present disclosure, based on the foregoing solution, before acquiring the vehicle parameters of the target vehicle and the scene parameters of the scene where the target vehicle is located, the acquiring module 401 is further configured to: acquire the scene where the target vehicle is located; and analyze the scene to obtain the scene parameters of the scene where the target vehicle is located.

In an embodiment of the present disclosure, based on the foregoing solution, if the vehicle parameters are not within the preset vehicle parameter range, after the target strategy is generated, the generation module 403 is further configured to store the vehicle parameters, the scene parameters and the target strategy correspondingly in the strategy library.

In an embodiment of the present disclosure, based on the foregoing solution, after acquiring the vehicle parameters of the target vehicle and the scene parameters of the scene where the target vehicle is located, the control module 404 is further configured to: determine the recommended vehicle parameter range of the vehicle based on the scene parameters; if the recommended vehicle parameter range does not intersect with the capacity vehicle parameter range of the target vehicle, it is determined that the target vehicle is not capable of running in the scene where the target vehicle is located.

It should be understood for those skilled in the art that various aspects of the present disclosure can be implemented as a system, a method, or a program product. Therefore, each aspect of the present disclosure can be specifically implemented in the following forms, i.e., complete hardware implementation, complete software implementation (including firmware, microcode, etc.), or a combination of hardware and software implementations, which can be collectively referred to herein as "circuit", "module" or "system".

The electronic device 50 according to the embodiment of the present disclosure is described below with reference to FIG. 5. The electronic device 50 shown in FIG. 5 is only an example, and should not bring any limitation to the function and scope of use of the embodiments of the present disclosure.

Figure 5:
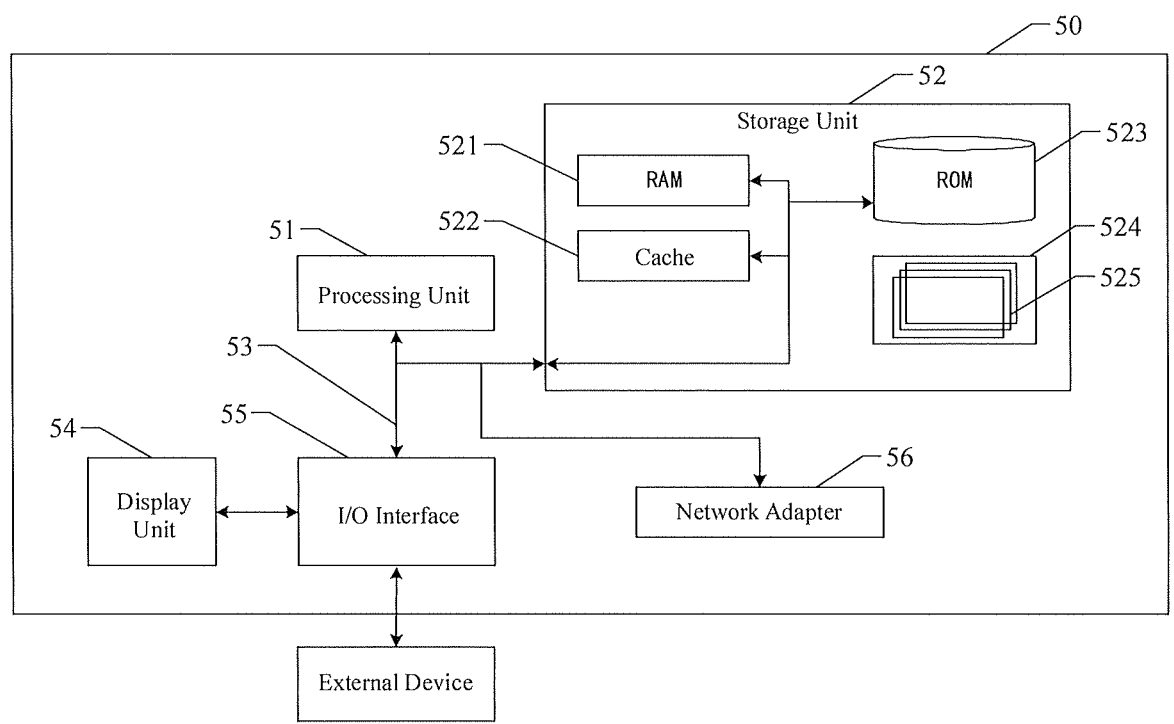
FIG. 5 is a hardware diagram of an electronic device according to an exemplary embodiment.

As shown in FIG. 5, the electronic device 50 is represented in the form of a general-purpose computing device. The components of the electronic device 50 may include, but are not limited to: the above-mentioned at least one processing unit 51, the above-mentioned at least one storage unit 52, a bus 53 connecting different system components (including the storage unit 52 and the processing unit 51), and a display unit 54.

The storage unit stores a program code, and the program code can be executed by the processing unit 51, so that the processing unit 51 executes the steps according to various exemplary implementations of the present disclosure described in the above-mentioned "embodiment of method" section of this specification The storage unit 52 may include a readable medium in the form of a volatile storage unit, such as a random access storage unit (RAM) 521 and/or a cache storage unit 522, and may further include a read-only storage unit (ROM) 523.

The storage unit 52 may also include a program/utility tool 524 having a set (at least one) program module 525. The program module 525 includes but is not limited to: an operating system, one or more application programs, other program modules, and program data, in which each of these examples or some combination may include the implementation of a network environment.

The bus 53 may represent one or more of several types of bus structures, including a storage unit bus or a storage unit controller, a peripheral bus, a graphics acceleration port, a processing unit, or a local area bus using any bus structure among multiple bus structures.

The electronic device 50 may also communicate with one or more external devices (such as keyboards, pointing devices, Bluetooth devices, etc.), and may also communicate with one or more devices that enable a user to interact with the electronic device 50, and/or communicate with any device (such as a router, modem, etc.) that enables the electronic device 50 to communicate with one or more other computing devices. This communication can be performed through an input/output (I/O) interface 55. In addition, the electronic device 50 may also communicate with one or more networks (for example, a local area network (LAN), a wide area network (WAN), and/or a public network, such as the Internet) through the network adapter 56. As shown in the figure, the network adapter 56 communicates with other modules of the electronic device 50 through the bus 53. It should be understood that although not shown in the figure, other hardware and/or software modules can be used in conjunction with the electronic device 50, including but not limited to: microcode, device driver, redundant processing unit, external disk drive arrays, RAID system, tape drive and data backup storage system.

Through the description of the above embodiments, it should be easily understood for those skilled in the art that the exemplary embodiments described herein can be implemented by software, or can be implemented by combining software with necessary hardware. Therefore, the technical solution according to the embodiments of the present disclosure can be embodied in the form of a software product, which can be stored in a non-volatile storage medium (can be CD-ROM, U disk, mobile hard disk, etc.) or on the network, including several instructions to make a computing device (which can be a personal computer, a server, a terminal device, or a network device, etc.) execute the method according to the embodiments of the present disclosure.

According to an embodiment of the present disclosure, there is also provided a computer-readable storage medium on which is stored a program product capable of implementing the above-mentioned method in this specification. In some possible embodiments, various aspects of the present disclosure can also be implemented in the form of a program product, which includes a program code. When the program product runs on a terminal device, the program code is used to make the terminal device executes the steps according to various exemplary embodiments of the present disclosure described in the above-mentioned "exemplary method" section of this specification.

According to one embodiment of the present disclosure, there is also provided a computer-readable storage medium. The non-transitory computer-readable storage medium stores computer-readable instructions, and when the computer-readable instructions are executed by a processor of a computer, the computer is caused to execute the above vehicle control method.

According to an embodiment of the present disclosure, the program product used to implement the above-mentioned method may adopt a portable compact disk read-only memory (CD-ROM) and include program code, and may run on a terminal device, such as a personal computer. However, the program product of this application is not limited to this. In this document, the readable storage medium can be any tangible medium that contains or stores a program, and the program can be used by an instruction execution system, apparatus, or device, or combination thereof.

The program product can use any combination of one or more readable media. The readable medium may be a readable signal medium or a readable storage medium. The readable storage medium may be, for example, but not limited to, a system, apparatus, or device of electricity, magnetism, optics, electromagnetism, infrared ray, or semiconductor, or a combination of any of the above. More specific examples (non-exhaustive list) of readable storage media include: electrical connections with one or more wires, portable disks, hard disks, random access memory (RAM), read-only memory (ROM), erasable type programmable read only memory (EPROM or flash memory), optical fiber, portable compact disk read only memory (CD-ROM), optical storage device, magnetic storage device, or any suitable combination of the above.

The computer-readable signal medium may include a data signal propagated in baseband or as a part of a carrier wave, and the readable program code is carried therein. The propagated data signal can be adopted in many forms, including but not limited to electromagnetic signals, optical signals, or any suitable combination of the above. The readable signal medium may also be any readable medium other than a readable storage medium, and the readable medium may send, propagate, or transmit a program for use by or in combination with the instruction execution system, apparatus, or device.

The program code contained on the readable medium can be transmitted by any suitable medium, including but not limited to wireless, wired, optical cable, radio frequency (RF), etc., or any suitable combination of the above.

The program code for performing the operations of the disclosure can be written in any combination of one or more programming languages. The programming languages include object-oriented programming languages, such as Java and C++, as well as conventional procedural programming languages, such as "C" language or similar programming language. The program code can be executed entirely on the user's computing device, or partly on the user's device, or executed as an independent software package, or partly executed on the user's computing device and partly executed on the remote computing device, or entirely execute on the remote computing device or server. In the case of a remote computing device, the remote computing device can be connected to a user computing device through any kind of network, including a local area network (LAN) or a wide area network (WAN), or can be connected to an external computing device (for example, use an Internet service provider to connect via the Internet).

In addition, the above-mentioned drawings are merely schematic illustrations of the processing included in the method according to the exemplary embodiments of the present disclosure, and are not intended for limitation. It is easy to understand that the processing shown in the above drawings does not indicate or limit the time sequence of these processings. In addition, it is easy to understand that these processings can be executed synchronously or asynchronously in multiple exemplary modules.

It should be understood that the present disclosure is not limited to the precise structure that has been described above and shown in the drawings, and various modifications and changes can be performed without departing from its scope. The scope of this application is only limited by the appended claims.

What is claimed is:

1. A vehicle control method, comprising:
   acquiring vehicle parameters of a target vehicle and scene parameters of a scene where the target vehicle is located;
   searching for a target strategy corresponding to the vehicle parameters and the scene parameters in a strategy library, if the vehicle parameters are within a preset vehicle parameter range and the scene parameters are within a preset scene parameter range, wherein the strategy library is offline;
   inputting the vehicle parameters and the scene parameters into a pre-training model to generate the target strategy, if the vehicle parameters are not within the preset vehicle parameter range or the scene parameters are not within the preset scene parameter range, wherein the pre-training model is online; and
   controlling the target vehicle based on the target strategy;
   before searching for the target strategy corresponding to the vehicle parameters and the scene parameters in the strategy library, the method further comprises:
   acquiring simulation data, wherein the simulation data comprise vehicle simulation data and scene simulation data;
   inputting the simulation data into a Partially Observable Markov Decision Process, and obtaining a prediction strategy corresponding to the simulation data output by the Partially Observable Markov Decision Process; and
   storing the simulation data and the prediction strategy to form the strategy library;
   the scene simulation data comprise dynamic simulation data and static simulation data, and before inputting the vehicle parameters and the scene parameters into the pre-training model, the method further comprises:
   clustering the vehicle simulation data, the dynamic simulation data, and the static simulation data respectively to obtain a vehicle clustering result, a dynamic clustering result, and a static clustering result;
   generating training data based on the vehicle clustering result, the dynamic clustering result, and the static clustering result, wherein the training data comprise vehicle training data, dynamic training data, and static training data; and
   training a neural network model by using the training data to obtain the pre-training model.

2. The vehicle control method of claim 1, wherein generating training data based on the vehicle clustering result, the dynamic clustering result, and the static clustering result comprises:
   selecting the vehicle training data from a vehicle cluster of the vehicle clustering results, wherein a difference degree of the vehicle training data in a same vehicle cluster is greater than a set minimum vehicle difference degree;
   selecting the dynamic training data from a dynamic cluster of the dynamic clustering results, wherein a difference degree of the dynamic training data in a same dynamic cluster is greater than a set minimum dynamic difference degree; and
   selecting the static training data from a static cluster of the static clustering results, wherein a difference degree of the static training data in a same static cluster is greater than a set minimum static difference degree.

3. The vehicle control method of claim 1, wherein before acquiring the vehicle parameters of the target vehicle and the scene parameters of the scene where the target vehicle is located, the method further comprises:
   acquiring the scene where the target vehicle is located; and
   analyzing the scene to obtain the scene parameters of the scene where the target vehicle is located.

4. The vehicle control method of claim 1, wherein if the vehicle parameters are not within the preset vehicle parameter range, after generating the target strategy, the method further comprises:
   storing the vehicle parameters, the scene parameters, and the target strategy to the strategy library.

5. The vehicle control method of claim 1, wherein after acquiring the vehicle parameters of the target vehicle and the scene parameters of the scene where the target vehicle is located, the method further comprises:
   determining a recommended vehicle parameter range of the vehicle based on the scene parameters;
   determining that the target vehicle is incapable of running in the scene where the target vehicle is located, if the recommended vehicle parameter range does not intersect with a capacity vehicle parameter range of the target vehicle.

6. An electronic device, comprising:
   a memory, for storing computer-readable instructions; and
   a processor, for reading the computer-readable instructions stored in the memory to execute a vehicle control method, wherein the vehicle control method comprises:
   acquiring vehicle parameters of a target vehicle and scene parameters of a scene where the target vehicle is located;
   searching for a target strategy corresponding to the vehicle parameters and the scene parameters in a strategy library, if the vehicle parameters are within a preset vehicle parameter range and the scene parameters are within a preset scene parameter range, wherein the strategy library is offline;
   inputting the vehicle parameters and the scene parameters into a pre-training model to generate the target strategy, if the vehicle parameters are not within the preset vehicle parameter range or the scene parameters are not within the preset scene parameter range, wherein the pre-training model is online; and
   controlling the target vehicle based on the target strategy;
   before searching for the target strategy corresponding to the vehicle parameters and the scene parameters in the strategy library, the method further comprises:

acquiring simulation data, wherein the simulation data comprise vehicle simulation data and scene simulation data;

inputting the simulation data into a Partially Observable Markov Decision Process, and obtaining a prediction strategy corresponding to the simulation data output by the Partially Observable Markov Decision Process; and storing the simulation data and the prediction strategy to form the strategy library;

the scene simulation data comprise dynamic simulation data and static simulation data, and before inputting the vehicle parameters and the scene parameters into the pre-training model, the method further comprises:

clustering the vehicle simulation data, the dynamic simulation data, and the static simulation data respectively to obtain a vehicle clustering result, a dynamic clustering result, and a static clustering result;

generating training data based on the vehicle clustering result, the dynamic clustering result, and the static clustering result, wherein the training data comprise vehicle training data, dynamic training data, and static training data; and training a neural network model by using the training data to obtain the pre-training model.

7. The electronic device of claim 6, wherein generating training data based on the vehicle clustering result, the dynamic clustering result, and the static clustering result comprises:

selecting the vehicle training data from a vehicle cluster of the vehicle clustering results, wherein a difference degree of the vehicle training data in a same vehicle cluster is greater than a set minimum vehicle difference degree;

selecting the dynamic training data from a dynamic cluster of the dynamic clustering results, wherein a difference degree of the dynamic training data in a same dynamic cluster is greater than a set minimum dynamic difference degree; and selecting the static training data from a static cluster of the static clustering results, wherein a difference degree of the static training data in a same static cluster is greater than a set minimum static difference degree.

8. The electronic device of claim 6, wherein before acquiring the vehicle parameters of the target vehicle and the scene parameters of the scene where the target vehicle is located, the method further comprises:

acquiring the scene where the target vehicle is located; and analyzing the scene to obtain the scene parameters of the scene where the target vehicle is located.

9. The electronic device of claim 6, wherein if the vehicle parameters are not within the preset vehicle parameter range, after generating the target strategy, the method further comprises:

storing the vehicle parameters, the scene parameters, and the target strategy to the strategy library.

10. The electronic device of claim 6, wherein after acquiring the vehicle parameters of the target vehicle and the scene parameters of the scene where the target vehicle is located, the method further comprises:

determining a recommended vehicle parameter range of the vehicle based on the scene parameters;

determining that the target vehicle is incapable of running in the scene where the target vehicle is located, if the recommended vehicle parameter range does not intersect with a capacity vehicle parameter range of the target vehicle.

11. A non-transitory computer-readable storage medium, wherein the non-transitory computer-readable storage medium stores computer-readable instructions, and when the computer-readable instructions are executed by a processor of a computer, the computer is caused to execute a vehicle control method, wherein the vehicle control method comprises:

acquiring vehicle parameters of a target vehicle and scene parameters of a scene where the target vehicle is located;

searching for a target strategy corresponding to the vehicle parameters and the scene parameters in a strategy library, if the vehicle parameters are within a preset vehicle parameter range and the scene parameters are within a preset scene parameter range, wherein the strategy library is offline;

inputting the vehicle parameters and the scene parameters into a pre-training model to generate the target strategy, if the vehicle parameters are not within the preset vehicle parameter range or the scene parameters are not within the preset scene parameter range, wherein the pre-training model is online; and controlling the target vehicle based on the target strategy;

before searching for the target strategy corresponding to the vehicle parameters and the scene parameters in the strategy library, the method further comprises:

acquiring simulation data, wherein the simulation data comprise vehicle simulation data and scene simulation data;

inputting the simulation data into a Partially Observable Markov Decision Process, and obtaining a prediction strategy corresponding to the simulation data output by the Partially Observable Markov Decision Process; and storing the simulation data and the prediction strategy to form the strategy library;

the scene simulation data comprise dynamic simulation data and static simulation data, and before inputting the vehicle parameters and the scene parameters into the pre-training model, the method further comprises:

clustering the vehicle simulation data, the dynamic simulation data, and the static simulation data respectively to obtain a vehicle clustering result, a dynamic clustering result, and a static clustering result;

generating training data based on the vehicle clustering result, the dynamic clustering result, and the static clustering result, wherein the training data comprise vehicle training data, dynamic training data, and static training data; and training a neural network model by using the training data to obtain the pre-training model.

12. The non-transitory computer-readable storage medium of claim 11, wherein generating training data based on the vehicle clustering result, the dynamic clustering result, and the static clustering result comprises:

selecting the vehicle training data from a vehicle cluster of the vehicle clustering results, wherein a difference degree of the vehicle training data in a same vehicle cluster is greater than a set minimum vehicle difference degree;

selecting the dynamic training data from a dynamic cluster of the dynamic clustering results, wherein a difference degree of the dynamic training data in a same dynamic cluster is greater than a set minimum dynamic difference degree; and selecting the static training data from a static cluster of the static clustering results, wherein a difference degree of the static training data in a same static cluster is greater than a set minimum static difference degree.

13. The non-transitory computer-readable storage medium of claim 11, wherein before acquiring the vehicle parameters of the target vehicle and the scene parameters of the scene where the target vehicle is located, the method further comprises:
  acquiring the scene where the target vehicle is located; and
  analyzing the scene to obtain the scene parameters of the scene where the target vehicle is located.

14. The non-transitory computer-readable storage medium of claim 11, wherein if the vehicle parameters are not within the preset vehicle parameter range, after generating the target strategy, the method further comprises:
  storing the vehicle parameters, the scene parameters, and the target strategy to the strategy library.

\* \* \* \* \*